J. C. GRIESEL.
INCUBATOR.
APPLICATION FILED AUG. 25, 1916.

1,257,847.

Patented Feb. 26, 1918.
2 SHEETS—SHEET 1.

Witnesses
Thos. F. Knox
Wm Baggin

Inventor
John C. Griesel
By Victor J. Evans
Attorney

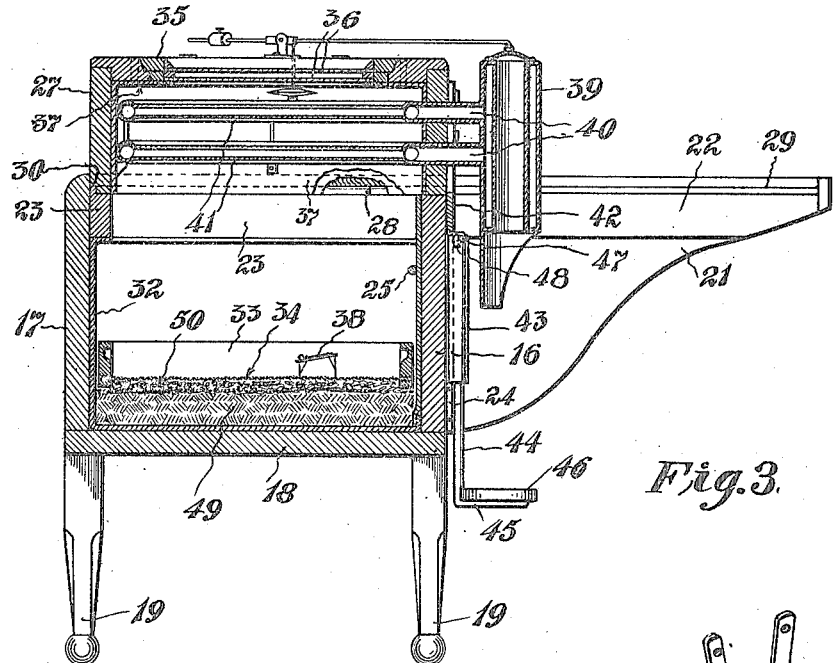
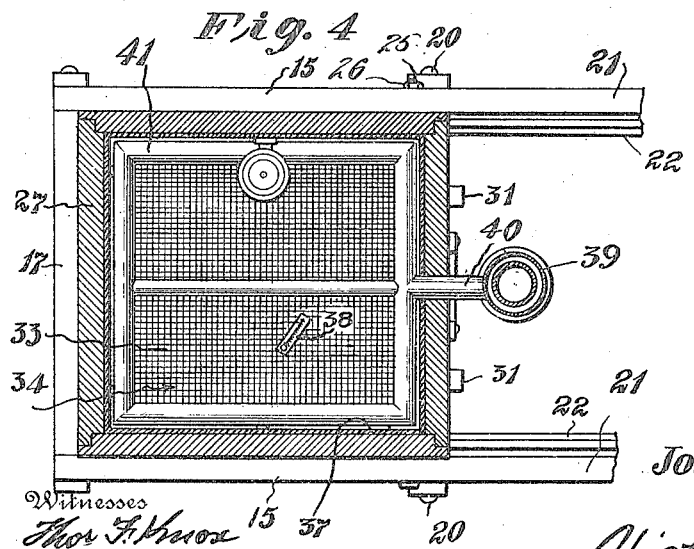
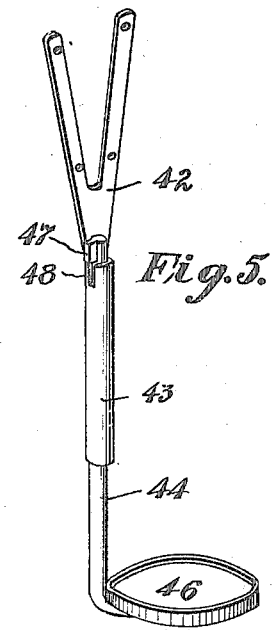

UNITED STATES PATENT OFFICE.

JOHN C. GRIESEL, OF POTTSVILLE, PENNSYLVANIA, ASSIGNOR OF ONE-HALF TO CHARLES F. SCHLINTZ, OF POTTSVILLE, PENNSYLVANIA.

INCUBATOR.

1,257,847.

Specification of Letters Patent.

Patented Feb. 26, 1918.

Application filed August 25, 1916. Serial No. 116,879.

*To all whom it may concern:*

Be it known that I, JOHN C. GRIESEL, a citizen of the United States, residing at Pottsville, in the county of Schuylkill and State of Pennsylvania, have invented new and useful Improvements in Incubators, of which the following is a specification.

This invention relates to incubators, and it has for its object to produce an incubator of simple and improved construction, the operation of which will imitate, as nearly as possible, the incubation of eggs by a mother hen.

A further object of the invention is to produce a simple and improved incubator in which the top compartment containing the heating apparatus may be temporarily moved to one side so as to temporarily expose the eggs to the action of the normal atmosphere much in the same manner as happens when the hen leaves her nest for a short time during the period of incubation.

A further object of the invention is to simplify and improve the general construction and arrangement of the detailed parts of the device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Fig. 3 is a longitudinal vertical section taken on the line 3—3 in Fig. 2.

Fig. 4 is a transverse sectional view taken on the line 4—4 in Fig. 1.

Fig. 5 is a perspective detail view of the lamp bracket and related parts.

Corresponding parts in the several figures are denoted by like characters of reference.

Figure 1:
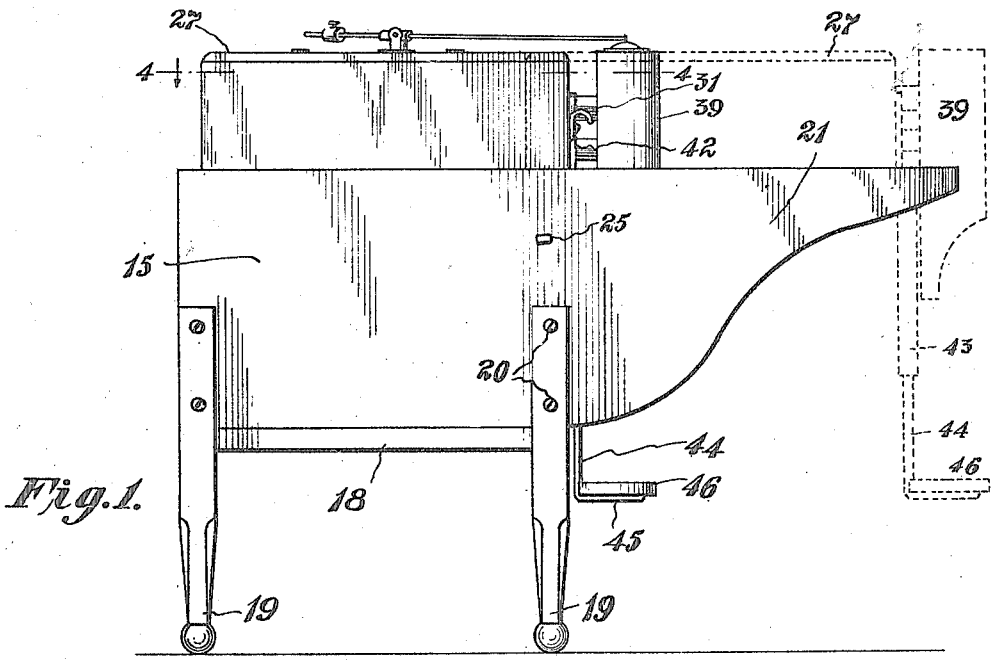
Figure 1 is a side elevation of an incubator constructed in accordance with the invention, the top compartment being shown in dotted lines moved to one side.
Figure 2:
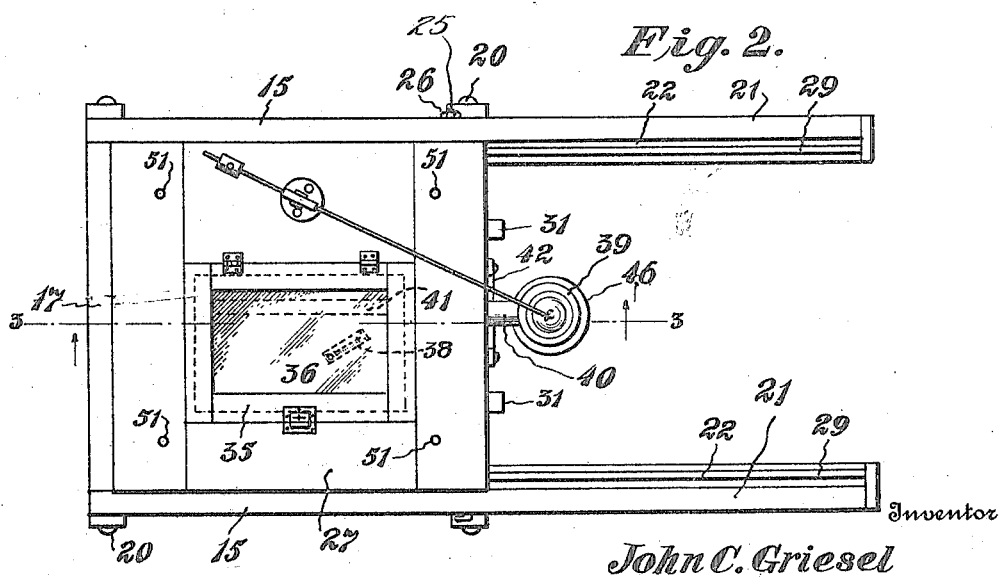
Fig. 2 is a top plan view.

The body of the incubator consists of a substantially square or rectangular box having side members 15, front and rear end walls 16, 17 and a bottom member 18. The box is supported on legs 19 which are detachably connected therewith by screws 20 to enable the legs to be readily detached and packed within the box for convenience in storage or shipment. The side members 15 are provided with brackets 21 extending forwardly of the front wall 16, said side walls including the brackets 21 being provided on their inner faces with cleats 22, the top faces of which are disposed in the plane of the top edge of the front wall member 16. The rear wall member is also provided with a cleat 23 corresponding with the cleats 22. The front wall member 16 is loosely supported between the side members 15, the latter being provided with vertically disposed detachable cleats 24 on which the said front wall member abuts, it being clamped securely in position by means of a clamp rod 25 extending through the side wall members and provided with a nut 26. This construction enables the front wall member to be readily detached, not only for the purpose of facilitating the cleaning of the interior of the incubator, but also to enable the movable parts of the incubator to be assembled within the incubator box for convenience in storing and shipping the same.

The top member of the incubator consists of an inverted box 27 which is fitted between the side walls 15 so as to rest slidably on the cleats 22, the opposed faces of the side members of the box and of the cleats being provided with interengaging grooves and tongues 28, 29 to make a substantially airproof joint. For the same purpose the opposed portions of the rear wall of the top member 27 and the cleat 23 are rabbeted, as seen at 30. The opposed faces of the front members of the incubator box and the top member 27 are snugly fitted together. The front wall of the top member 27 is provided with draw pulls or handles 31 to enable the top member to be slid forward by an operator standing between the brackets 21.

The interior of the incubator box has a close fitting lining 32 of material such as tar board or heavy tar paper which is a poor conductor of heat and which is also water proof. A tray 33 having a foraminous bottom 44 of wire fabric or the like is arranged within the incubator box.

The top member 27 is provided in the top portion thereof with a hinged door 35, said door being rabbeted into the top member to produce a substantially air-tight closure, said door being also provided with a sight opening protected by two panes of glass 36, the same being spaced apart so as to produce a dead air space therebetween. The top member is also lined throughout with material 37 which is a poor conductor of heat, such as straw board, asbestos or the like. A thermometer 38 is supported in a convenient position to be visible through the sight opening.

Supported exteriorly on the front wall of the top member is a tank 39, said tank member supported by means of circulating pipes 40 that extend within the top member to form heating coils 41. A lamp bracket 42 is also supported exteriorly on the front wall of the top member, said lamp bracket including a downwardly extending tube 43 within which is loosely fitted a rod 44 having at its lower end an arm 45 on which a lamp supporting shelf 46 is mounted. The rod 44 has at its upper end a stop member 47 engaging the upper edge of the tube 43, which latter is provided with a notch 48. It will be readily seen that by swinging the rod 44 about its axis, the lamp supported on the shelf 46 may be positioned directly beneath the tank 39 so as to heat the contents thereof, or it may be swung to an out-of-the-way position to permit the contents of the tank to cool without extinguishing the lamp. The notch 48 in the top edge of the tube 43 is so positioned as to be engaged by the stop member 47 when the lamp supporting shelf is directly beneath the tank, thus interlocking the parts and preventing the shelf from accidentally swinging to an out-of-the-way position. It is obvious that by providing additional notches, the lamp supporting shelf may be secured in various positions.

The top member of the device is provided with one or more ventilators 51 of suitable construction to permit the necessary circulation of air within the incubator.

In the use of the improved incubator, the incubator box is filled to the depth of several inches with earth or clay 49, the same being tightly packed within the box. The egg tray is then placed directly on the earth, after which the top member is placed in position and the lamp ignited. It is here deemed desirable to state that while a simple water circulating system has been shown for the purpose of heating the interior of the incubator, any other heating system may be employed if preferred. The progress of the hatch may be inspected through the sight opening which also permits the thermometer to be seen, so that the heat may be properly regulated. The eggs may be reached through the door 35 when it shall be desired to turn or otherwise to manipulate the same. At intervals during the period of incubation it is desirable to move the top member temporarily to an out-of-the-way position where it will be supported on the bracket members 21. This may be done without in the least disturbing the eggs, and it is done for the purpose of subjecting the eggs at intervals to the action of the normal atmosphere, such as happens when the mother hen leaves her nest, the particular purpose of the present invention being to imitate nature as closely as possible in the process of incubation. It is for the same reason that a layer of earth or clay is provided within the incubator box. It may here be stated that it is preferred to lightly cover the earth with a layer of hay or like material to resemble the nest as closely as possible, such material being shown at 50. Moisture in sufficient quantity will be supplied by evaporation from the earth or clay 49, and it may be stated that I have found it unnecessary to replenish the same more frequently than once for three or four hatches. The impervious water proof lining 32 protects the incubator box from injury by the moist earth or clay, which latter when it shall be found necessary to renew it may be easily removed by detaching the movable front wall of the incubator box.

The general construction of the improved incubator, as will be seen from the foregoing description, is extremely simple, and the device may be furnished at a very moderate expense, and I have also found by practical experience that a very large percentage of eggs will be successfully hatched, and that the chicks appear to be more healthy and vigorous than those hatched in incubators constructed on different principles.

Having thus described the invention, what is claimed as new, is:—

1. In an incubator, an incubator box comprising front, rear and side members, the side members being extended to form brackets that project forwardly at the two sides of the box, in combination with a top member consisting of an inverted box supported slidably on the box member and on the brackets extending therefrom.

2. In an incubator, an incubator box comprising front, rear and side members, the side members being extended to form brackets that project forwardly at the two sides of the box, in combination with a top member consisting of an inverted box supported slidably on the box member and on the brackets extending therefrom, the opposed faces of the top member and the supporting means therefor having interengaging grooves and tongues to produce tight joints.

3. The combination with an incubator box having side members that are extended to form forwardly projecting brackets, of a top member consisting of an inverted box slidably supported on the side members of the incubator box and on the brackets extending therefrom, and a heating apparatus carried by said top member.

In testimony whereof I affix my signature.

JOHN C. GRIESEL.

Copies of this patent may be obtained for five cents each, by addressing the "Commissioner of Patents, Washington, D. C."